Patented Oct. 12, 1943

2,331,594

UNITED STATES PATENT OFFICE 2,331,594

PROCESS FOR INCREASING PRODUCTION OF PETROLEUM OIL FROM SILICEOUS STRATA AND THE TREATING AGENT THEREFOR

Charles M. Blair, Jr., Webster Groves, Mo., assignor to Petrolite Corporation, Ltd., Wilmington, Del., a corporation of Delaware No Drawing. Application January 23, 1942, Serial No. 427,982

20 Claims. (Cl. 252—8.55)

This invention relates to the chemical treatment of sandy or siliceous geological formations or strata, penetrated by and surrounding oil well bores or cavities, in order to render such formations preferentially wettable by oil.

The principal object of the present invention is to increase the proportion of oil and decrease the proportion of water produced by a well prior to chemical treatment of the kind herein contemplated. Such alteration in ratio of fluid volumes produced may accomplish any one of a number of specific results, varying with local conditions. In some instances wells may be converted from unproductive wells to productive wells; i. e., strata which would not otherwise justify commercial exploitation may be operated on a sound basis. In some cases treatment of the kind herein contemplated will cause a productive well to yield an even greater output of crude oil, i. e., increase its productivity. Furthermore, not only does such treatment involve a change in the rate at which oil may be produced; but also it may affect, and in many instances yield, a greater total output of oil from a particular well, cavity, or formation volume, than would be otherwise possible. In other words, such treatment not only affects current rate of production, but also the entire volume of oil produced during the life of the well.

Chemical treatment of an oil well of the kind herein described may not only accomplish one or more of the results or objects above mentioned; but also it will reduce current lifting charges due to the fact that a greater amount of water is left behind in the strata when the final depletion stage is reached. Additional objects are obvious; to wit, in many instances objectionable operating conditions, such as corrosion, emulsion formation, etc., may be decreased or eliminated, due to the lesser amount of water produced per barrel of oil.

The agents which are employed in the present process to impart oil wettability to sandy or siliceous strata, are high molecular weight amines and substituted ammonium compounds. In its broadest aspect, the present invention is concerned with the application of the described agents in any suitable or feasible manner. It happens, however, that our preferred form, in fact the form which is markedly more effective, represents a rather unusual mixture or solution. The solutions are of the kind which exhibit the unusual property of having zero or practically zero interfacial tension against both water, including oil field brines, and oils. This is a property of great practical importance, since it permits easy introduction of the treating solution into either oil-filled or water-filled capillaries without resistance, due to the intefacial tension or Jamin action.

Many other modifications of the methods subsequently disclosed will be apparent to those skilled in the art and are accordingly within the spirit and scope of the invention, as defined in the appended claims.

It is generally recognized that sand is more readily wet by water than by oils. As a result, the encroachment of water into oil-bearing sand formations is greatly favored by the forces of capillary attraction. Such encroachment results finally in the "breaking through" or rising of water into the well bore. Water is then produced along with the oil. In addition, the water decreases the production of oil, since its presence in capillary channels blocks the flow of oil which would otherwise occur through these channels. This effect is particularly objectionable when it occurs at the face of the bore hole and in its immediate vicinity as the rate and volume of oil production appears to be highly dependent upon the area of oil permeable formation exposed to the open hole.

In a preferentially water-wettable capillary system, such as is formed by ordinary sand formations, water is strongly held and its displacement by oil is opposed by the force of the interfacial tension at the oil-water interface. The treatment of the present invention changes the sand formation to one preferentially wet by oil with the result that the force of interfacial tension at the oil-water interface then favors the displacement of water by oil in the capillary system, or, conversely, opposes the displacement of oil by water.

A number of methods of controlling oil and water production from sand formations have been used or proposed for use. These methods generally fall into two broad classes. The first class constitutes the processes of plugging of the water-producing capillaries by such substances as Portland cement, silicic acid gels, insoluble inorganic salts, polyvalent metal soaps, cellulose acetate, etc. The second class of methods constitutes those in which the formation is made preferentially oil wettable by treating with oil- and water-insoluble hydrophobic materials such as heavy metal soaps, copper sulfide, sulfurized asphalt, etc.

The plugging process is confronted with a number of operative difficulties which are inherently unavoidable, for the reason that no practical method is available for selectively plugging water-producing capillaries, without at least partial or significant plugging of the oil-producing formation. Furthermore, the nature of the plugs which are formed is such that they are invariably porous and water-wettable; i. e., a wet septum. Such structure may constitute more of a hindrance to oil penetration than to water penetration.

Similarly, the second general method employed involves operating difficulties due to the fact that usually the hydrophobic substance employed as a coating agent must be formed by a precipitation reaction within the formation. Since the materials formed in situ are oil-insoluble, as well as water-insoluble, there is the distinct possibility that plugging of oil-bearing strata may take place. An added difficulty in connection with the procedure employed in the second class of materials, is that they are not specifically adsorbed by the sand or silica particles constituting the formation; and thus such sand and silica particles are not thoroughly and uniformly coated with a hydrophobic layer. Furthermore, in any event, the layer of deposited material, i. e., formed by reaction in situ, yields particles of macroscopic thickness, which must inevitably reduce the cross-sectional area of the pores of the formation.

The process of the present invention departs from these previous processes in that it has as its object the preparation of oil-wettable sand bodies by treatment with oil or water solutions or other solutions of the kind to be described and containing reagents which are specifically adsorbed by silica surfaces to yield a stable oil-wettable layer which appears to be only one molecule thick or at most only a few molecules thick. The reagents used in the present process may be either oil- or water-soluble but are adsorbed on silica from such solutions to give surfaces which are preferentially oil-wetted and are resistant to alteration in this property by rubbing or washing in either water or oil. In fact, the surface films formed can generally be removed only by drastic chemical treatment.

The preferred reagents which are employed in the present process to impart oil wettability to sandy or siliceous formations are amines and substituted ammonium compounds having molecular weights from about 150 to about 1200. These materials appear to be specifically adsorbed on silica surfaces and to be held by forces resembling those acting in actual chemical binding. It is known that silica has acidic properties; and in contact with aqueous solutions, silica usually carries a negative surface charge which is believed to result from the ionization of surface molecules of silicic acid or alkali silicate. High molecular weight amines and substituted ammonium compounds ionize, at least in aqueous solution, to give high molecular weight positively charged ions. When solutions containing the substituted ammonium cations are brought in contact with negatively charged silica surfaces, the cations become firmly attached to the surface. The adsorption apparently results in the formation of a very stable and insoluble surface layer of substituted ammonium silicate. Where the cation contains a large, nonpolar, hydrophobic residue, this residue appears to be oriented away from the silica surface and toward the solution, thus imparting hydrophobic and oleophilic properties to the film.

The amines and substituted ammonium compounds found to be effective in the present process are those containing 8 or more carbon atoms, and those found especially effective contain 14 or more carbon atoms per molecule. In some instances the hydrocarbon portion of the amine or substituted ammonium compound may be derived from acids prepared by oxidation of petroleum oil fractions and having as many as 30 or 32 carbon atoms. The presence of two such groups in a substituted ammonium compound would give a reagent containing about 60 carbon atoms, which represents the largest number of carbon atoms to be found in the compounds used. Single hydrocarbon groups attached to the nitrogen atom, and, in the preferred reagents, the saturated alkyl groups attached to nitrogen will generally contain not more than 30 carbon atoms.

The amines and substituted ammonium compounds are either basic nitrogen compounds or the salts or anhydrides of basic nitrogen compounds. The relationships between these materials are shown by the following structural formulae:

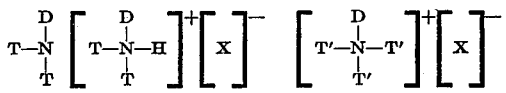

in which D is a monovalent organic radical of a kind to be described; T represents a hydrogen atom or a monovalent organic radical of a kind to be described, including D; T' represents a monovalent organic radical of the kind which may be symbolized by T; and X represents any suitable anion, including the hydroxyl group. The relation between the three structures indicated is readily appreciated by the fact that the quaternary ammonium compounds may be looked upon as a special type of substituted ammonium compounds, in which all four nitrogen-linked hydrogen atoms have been replaced by a monovalent organic radical. Furthermore, the amine type, i. e., the so-called trivalent nitrogen type, may be looked upon as a special type of substituted ammonium compound, to wit, the anhydride type, i. e., a type in which X of a substituted ammonium compound represents a hydroxyl group, and in which there is present at least one nitrogen atom-linked hydrogen atom, and in which the hydroxyl group and the aforementioned hydrogen atom were eliminated with the formation of water. In this sense, the relationship is comparable to that in which $NH_3$ is considered as an anhydride of $NH_4OH$. This may be illustrated in the conventional manner as follows:

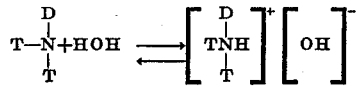

This group of compounds obviously has a community of chemical and physical properties. This is particularly true when such compounds are employed in solutions containing water or where the solutions used come into contact with water on the sand grains of the formation, for the reason that if an anhydride is employed, i. e., an amine showing the trivalent structure above illustrated, on contact with water, one obtains the hydrated type, i. e., the substituted ammonium type.

The amines and substituted ammonium compounds found to be effective in the present process are those which are symbolized by the above formulae where D is a monovalent organic radical containing at least 8 carbon atoms. This radical may be a hydrocarbon or substituted hydrocarbon; or it may be a hydrocarbon or substituted hydrocarbon in which the carbon to carbon linkage is interrupted by atoms such as oxygen, sulfur, or nitrogen. For exampe, D may be a radical composed of a hydrocarbon or substituted hydrocarbon residue directly attached to the ammonium nitrogen atom, or any such residue joined to the ammonium nitrogen by an oxygen, or sulfur, or nitrogen atom attached to the ammonium nitrogen by a lower hydrocarbon or substituted hydrocarbon group.

T, in the above formulae, in addition to representing a hydrogen atom, may represent a lower or higher molecular weight hydrocarbon or substituted hydrocarbon radical, with or without ring formation, or a radical of the kind represented by D. For example, T may be a radical such as methyl, ethyl, hexyl, phenyl, ethyl-oxy-ethyl, or the like. T' is a radical of the kind represented by D and T, but may not be a hydrogen atom. D, T, and T" in no event may be an acyl radical directly attached to the nitrogen, or any other radical which would destroy the basic property of the nitrogen atom. The molecule may, of course, contain other basic or non-basic nitrogen atoms as constituents of the monovalent organic radicals D, T, and T'.

X in the above formulae represents a hydroxyl group or an acid anion and may be either organic or inorganic. Examples of suitable anions are: hydroxyl, chloride, bromide sulfate, sulfite, hydrosulfide, nitrate, phosphate, borate, tartrate, citrate, lactate, phthalate, maleate, and the like.

The preferred reagents for use in the present process are those in which D represents a long, saturated alkyl chain radical of at least 10 carbon atoms, such as decyl, dodecyl, hexadecyl, octadecyl, or the like. Examples of the preferred types of effective reagents are: Hexadecylamine; hexadecylamine hydrochloride; octadecylamine; octadecylamine acetate; diethylcetyl amine hydosulfate; octadecyl trimethyl ammonium chloride; cetyl pyridinium bromide; 2-pentadecyl-4, 5-dihydroimidazole; 2-heptadecyl-4, 5-dihydroimidazole acetate; 2-heptadecyl-3-aminoethyl-4, 5-dihydroimidazole diacetate; cetyloxymethyl pyridinium hydrosulfate, stearyloxymethyl-N-ethyl piperidinium sulfate; decyl diethylamine; lauryl dimethylamine; cetyl dimethylphenyl ammonium chloride; benzylcetyldiethylammonium chloride; para-stearoylamino-phenyl- trimethyl - ammonium-sulfomethylate; heptadecyl-dibenzyl-benzimidazolium chloride; docosylamine; 2-heptadecyl-3-diethylene-diamino-4, 5-dihydroimidazole diacetate.

Other effective reagents which may be employed are: Octyl amine; dioctylamine; dioctylamine phosphate; oleylamine; oleyl pyridinium chloride; aminoethylstearamide; didocosylamine aminoethyl palmitate; triethanolamine monostearate; stearamidoethyl pyridinium chloride; ricinoleylamidoethylamine acetate; stearamidodiethylamino sulfate; diethylamino-ethyloctadecyl-carbonate. Further examples of suitable reagents are disclosed in U. S. Patent #2,053,616 to Landolt.

Other high molecular weight cation-active materials such as substituted phosphonium, sulfonium, and oxonium compounds, also have the property of being strongly adsorbed on silica surfaces; and many of these, especially those containing large hydrocarbon groups or chains, may be used to impart oil wettability to sand surfaces. However, because of their cost and lack of availability, they will not in general be as useful as the amines and ammonium compounds employed in the present process.

In practicing my invention, the sand formation is treated by pumping a solution of the reagent into the formation and allowing it to remain sufficiently long for adsorption on the sand grains to occur. When an amine is used, it may be put into solution as such or as a salt such as the chloride, phosphate, acetate, sulfate, or other salt which is sufficiently soluble in the solvent used. Amines of the preferred type are in general rather insoluble in water, and, therefore, their salts are used when water is chosen as the solvent. However, in non-aqueous or oil solvents, such as alcohols, kerosene, and crude oil, they are often sufficiently soluble to be employed directly. When substituted ammonium compounds, other than amine salts, are employed, they may be put into solution either as salts or hydroxides. The salts are in general cheaper, more soluble in non-aqueous solvents, and more easily handled than the hydroxides.

The reagents used in the present process are strongly adsorbed from even very dilute solutions, such as 0.01% or even less, and may be employed in such dilution. In many instances, the effectiveness of a solution containing a few hundredths of a per cent. of a selected agent can be demonstrated readily by immersing an absolutely clean water-wettable silica plate about the size of a microscopic slide in such very dilute solution of the selected nitrogenous compound, and agitating gently for a short period of time, for instance, a few minutes to a few hours, and then noting that the silica plate surfaces have been converted from a hydrophile state to a definitely hydrophobe state. However, I prefer to use stronger solution in order that appreciable amounts of treating reagent may be introduced into the formation without the handling of inconveniently large volumes of solution and without added cost due to labor, shutdown time, etc. The usual concentrations of reagent employed in solution are from 1% to about 25%. In certain instances even more concentrated solutions may be employed.

In the most desirable solutions, namely, those which exhibit practically zero interfacial tension against both brines and oils, I prefer to use, roughly speaking, 9–23% of the amine or substituted amine or other selected nitrogenous compounds.

As previously stated, my preferred application employs the peculiar type of solution which exhibits zero interfacial tension against brines and oil. Such solutions also have solvent and emulsifying power for both water and oil, and thus are effective in removing water or oil sheaths surrounding the sand grains of the formation being treated, thereby putting the grains into immediate contact with the treating solution. The solutions which I prefer to employ are characterized by the fact that, in addition to the treating reagent, they contain water, an oil, and an alcohol. It is a remarkable fact that mixtures of this kind can be found which, in the proper proportions, are perfectly clear and homogeneous. The stability of these solutions appears to arise partly from the presence of the actual treating reagents, which, because of their structure, probably act in a manner analogous to ordinary soaps insofar as their solubilizing power is concerned. It is known that ordinary soaps such as, for example, sodium oleate, in admixture with various alcohols are capable of forming homogeneous solutions with relatively large amounts of water and oil. For a discussion of such soap solutions and examples, see Holmes, J. Phys. Chem., 43, 495 (1939).

The alcohols which may be used in preparing my preferred treating solutions are those containing three or more carbon atoms and less than 30 carbon atoms, and may be either primary, secondary, or tertiary. Those most widely applicable are the primary and secondary aliphatic, alicyclic, mixed aliphatic-alicyclic, and aliphatic ether alcohols containing from four to 10 carbon atoms and including such alcohols as n-butanol, 2-butanol, 2-ethyl hexanol, n-hexanol, cyclohexanol, ethylene glycol monobutyl ether, diethylene glycol monoamyl ether, a-terpineol, furfuryl alcohol, oxidized pine oil, rosin oil, and the like. The choice of proper alcohol and its proportion in the mixture depends somewhat upon the treating reagent used, the amount and kind of oil employed, and the proportion of water used, and is best determined by preparing experimental mixtures on a small scale. Various representative formulae will subsequently be given.

The oils which may be used in preparing my preferred treating solutions are the liquid, water-insoluble hydrocarbons and chlorinated hydrocarbons, and preferably those which have high solvent power for crude oils. Examples of suitable oils are: kerosene, gasoline, benzol, carbon tetrachloride, dichlorethane, xylene, turpentine, pressure distillate, amylene dichloride, and the like. Crude oil itself may be used in some instances.

As examples of the preferred types of treating solutions to be used in the present process, the following formulae are presented wherein proportions are by weight:

*Treating solution #1*

| | Per cent |
|---|---|
| Hexadecylamine acetate | 10 to 14 |
| n-Butanol | 18 to 14 |
| Water | 38 to 42 |
| Kerosene | 34 to 30 |

*Treating solution #2*

| | Per cent |
|---|---|
| 2-heptadecyl-3-diethylene-diamino-4,5-dihydroimidazole diacetate | 12 to 23 |
| a-Terpineol | 7 to 12 |
| Water | 67 to 40 |
| Kerosene | 14 to 25 |

*Treating solution #3*

| | Per cent |
|---|---|
| 2-heptadecyl-3-diethylene-diamino-4,5-dihydroimidazole diacetate | 12 to 13 |
| n-Butanol | 17 to 18 |
| Kerosene | 29 to 23 |
| Water | 42 to 46 |

*Treating solution #4*

| | Per cent |
|---|---|
| Octadecylamine hydrochloride | 12 to 17 |
| n-Butanol | 16 to 22 |
| Water | 40 to 28 |
| Kerosene | 32 to 33 |

*Treating solution #5*

| | Per cent |
|---|---|
| Octadecylamine hydrochloride | 9 to 10 |
| Ethylene glycol monobutyl ether | 27 to 29 |
| Water | 37 to 32 |
| Benzene | 27 to 29 |

The sand surfaces treated by the present process show a strong affinity for non-polar materials, such as oil, asphalt, bitumen, and the like. In some instances, it is advantageous to follow my treating process with a treatment with an asphalt or bitumen solution. When this is done, the sand becomes covered with a uniform adsorbed layer of the asphalt or bitumen which tends to protect the under layer of adsorbed amine or substituted ammonium compound and renders the surface even more water-repellent. I have now found, however, that this after-treatment can often be eliminated and the same effect be obtained by incorporating asphalt or bitumen in the original treating solution. If the original treating solution consists of an oil solution, the asphalt or bitumen is simply dissolved in the oil with the treating reagent. With homogeneous solutions of the kind described in the above examples, the asphalt or bitumen is dissolved in the oil used in preparing the solution, and this is then mixed with the other ingredients. By proper choice of proportions of ingredients, clear, homogeneous mixtures are obtainable. Below is an example of a treating solution incorporating asphalt as one of the constituents:

*Treating solution #6*

| | Per cent |
|---|---|
| 2-heptadecyl-3-diethylenediamine-4,5-dihydroimidiazole | 12 to 13 |
| n-Butanol | 17 to 18 |
| Kerosene | 28 to 22 |
| High melting asphalt | 1 |
| Water | 42 to 46 |

High molecular weight amines and substituted ammonium compounds suitable for use in my process are apparently capable of forming association complexes with long chain aliphatic alcohols, which complexes are more soluble in hydrocarbon oils than the original amines or ammonium compounds. Solutions containing such long chain alcohols are suitable for treating sand to make it preferentially oil-wettable and in some instances appear to improve the water repellent properties of the adsorbed film. Long chain alcohols may be incorporated in oil solution of the treating reagent or into solutions of the type previously described, in which case the final treating solution may contain two different alcohols, one of high molecular weight, and one of lower molecular weight, as illustrated by the following

*Treating solution #7*

| | Per cent |
|---|---|
| 2-heptadecyl-3-diethylenediamino-4,5-dihydroimidazole diacetate | 11 to 10 |
| n-Butanol | 17 to 16 |
| Cetyl alcohol | 9 to 5 |
| Kerosene | 21 to 28 |
| Water | 42 to 41 |

As previously stated, the treating reagents may be employed in the form of simple aqueous or oil solutions. Such solutions lack some of the good features of my preferred solutions such as practically vanishing interfacial tension against oil and water and high solvent and emulsifying power for the well fluids, but because of their cheapness and simplicity of preparation will often be used. Examples of these solutions are as follows:

*Treating solution #8*

| | Per cent |
|---|---|
| Cetyl pyridinium bromide | 1 |
| Water | 99 |

*Treating solution #9*

| | Per cent |
|---|---|
| Octadecylamine | 1 |
| Benzene | 9 |
| Kerosene | 90 |

*Treating solution #10*

| | Per cent |
|---|---|
| Stearamidoethylpyridinium chloride | 1 |
| Denatured alcohol | 9 |
| Water | 90 |

The following example illustrates a procedure for carrying out the process of the present invention on a typical oil well producing from a sand formation and equipped with the usual casing and tubing. If the well is producing water, it is well to determine from what portion of the formation it is coming, as treatment may then be localized to this section with consequent savings in cost of reagent. The main source of water, if any, can often be located by pumping the well from various parts of the open hole which have been separated from the remainder by means of formation packers. After deciding from such tests which portion of the formation is to be treated, the tubing is packed so as to communicate with this section. Treating fluid such as, for example, Treating solution #3 above, is then run into the tubing and finally into the formation, pump pressure being applied if necessary to displace it into the sand. The amount of solution required will depend upon the amount of open formation being treated but usually will vary from about 4 to about 100 barrels. When all of the solution has been introduced into the tubing, crude oil is then pumped in after it to act as a piston to drive the solution back into the formation. The oil is pumped in slowly so that the treating solution will be in contact with the formation particles for at least a few seconds. Adsorption from the solutions occurs very rapidly, however. As more oil is introduced, the treating solution is gradually pushed farther and farther into the formation. Finally all of the solution will have entered the sand and the crude oil will begin to penetrate the treated portions, thus immediately saturating the capillaries with oil which now adheres strongly to the sand surfaces. On being pushed further into the formation, the treating solution eventually becomes spent due to adsorption of the active ingredients and dilution with the formation fluids. The amount of crude oil pumped into the formation behind the treating solution preferably should at least equal the volume of treating solution used and the use of even larger volumes is desirable, since it insures deep penetration of the treating fluid and thorough oil saturation of treated capillaries immediately surrounding the bore hole.

Following treatment, the well is kept shut in for a few hours, after which it is put back on production.

In carrying out my process, it is not necessary to take precautions against the treating solution entering the oil producing portions of the formation, as no plugging precipitates are formed. If desired, the use of a formation packer may be eliminated and the entire formation, both oil and water producing, may be treated. In some instances wells producing no water at all are treated in order to prevent water encroachment.

Having described my invention, I claim:

1. A method for rendering preferentially oil wettable the oil-bearing siliceous formation surrounding an oil well bore hole, which comprises depositing on the siliceous formation a relatively stable preferentially oil-wettable layer of an organic nitrogeneous compound selected from the group consisting of high molecular weight amines and substituted ammonium compounds having at least one aliphatic radical containing at least 8 carbon atoms.

2. A method for rendering preferentially oil wettable the oil-bearing siliceous formation surrounding an oil well bore hole, which comprises depositing on the siliceous formation a relatively stable preferentially oil-wettable layer of an amine having a molecular weight in excess of 150 and at least one aliphatic radical containing at least 8 carbon atoms.

3. A method for rendering preferentially oil wettable the oil-bearing siliceous formation surrounding an oil well bore hole, which comprises depositing on the siliceous formation a relatively stable preferentially oil-wettable layer of a substituted ammonium compound having a molecular weight in excess of 150 and at least one aliphatic radical containing at least 8 carbon atoms.

4. A method for rendering preferentially oil wettable the oil-bearing siliceous formation surrounding an oil well bore hole, which comprises depositing on the siliceous formation a relatively stable preferentially oil-wettable layer of a high molecular weight amine containing at least one saturated alkyl radical of from 10 to 30 carbon atoms.

5. A method for rendering preferentially oil wettable the oil-bearing siliceous formation surrounding an oil well bore hole, which comprises depositing on the siliceous formation a relatively stable preferentially oil-wettable layer of a high molecular weight substituted ammonium compound containing at least one saturated alkyl radical of from 10 to 30 carbon atoms.

6. The method as defined in claim 1 further characterized in that the formation is treated with a substantially acid-free solution of said organic compound to deposit said layer.

7. A method for rendering preferentially oil wettable the oil-bearing siliceous formation surrounding an oil well bore hole, which comprises treating the formation with a substantially acid-free water-containing solution of a high molecular weight amine containing at least one saturated alkyl radical of from 10 to 30 carbon atoms and depositing on the siliceous formation a relatively stable preferentially oil-wettable layer of said amine.

8. A method for rendering preferentially oil wettable the oil-bearing siliceous formation surrounding an oil well bore hole, which comprises treating the formation with a substantially acid-free water-containing solution of a high molecular weight substituted ammonium compound containing at least one saturated alkyl radical of from 10 to 30 carbon atoms and depositing on the siliceous formation a relatively stable preferentially oil-wettable layer of said compound.

9. A method for rendering preferentially oil wettable the oil-bearing siliceous formation surrounding an oil well bore hole, which comprises treating the formation with a mixture of a water-insoluble oil, water, an alcohol and an amine having a molecular weight in excess of 150 and at least one aliphatic radical containing at least 8 carbon atoms.

10. A method for rendering preferentially oil wettable the oil-bearing siliceous formation surrounding an oil well bore hole, which comprises treating the formation with a mixture of a water-insoluble oil, water, an alcohol and a substituted ammonium compound having a molecular weight in excess of 150 and at least one aliphatic radical containing at least 8 carbon atoms.

11. A treating agent for rendering siliceous formations oil wettable comprising a substantially acid-free solution of an organic nitrogeneous compound selected from the group consisting of amines and substituted ammonium compounds having molecular weights between 150 and 1200 and at least one aliphatic radical containing at least 8 carbon atoms said solution being capable of depositing a relatively stable preferentially oil-wettable layer on the siliceous formation.

12. A treating agent for rendering siliceous formations oil wettable comprising a high molecular weight amine having at least one aliphatic radical containing at least 8 carbon atoms, water, a water-insoluble oil and an alcohol, the components of said agent being proportioned to impart to the agent a substantially zero interfacial tension when in contact with water, brines and oils.

13. A treating agent for rendering siliceous formations oil wettable comprising a high molecular weight substituted ammonium compound having at least one aliphatic radical containing at least 8 carbon atoms, water, a water-insoluble oil and an alcohol, the components of said agent being proportioned to impart to the agent a substantially zero interfacial tension when in contact with water, brines and oils.

14. A treating agent for rendering siliceous formations oil wettable comprising a water-insoluble oil, an alcohol of at least 3 carbon atoms, water and a high molecular weight amine containing at least one saturated alkyl radical of from 10 to 30 carbon atoms, the components of said agents being proportioned to impart to the agent a substantially zero interfacial tension when in contact with water, brines and oils.

15. A treating agent for rendering siliceous formations oil wettable comprising a water-insoluble oil, an alcohol of at least 3 carbon atoms, water and a high molecular weight substituted ammonium compound containing at least one saturated alkyl radical of from 10 to 30 carbon atoms, the components of said agent being proportioned to impart to the agent a substantially zero interfacial tension when in contact with water, brines and oils.

16. The method as defined in claim 1 further characterized in that the siliceous formation is treated with a solution of said organic compound having substantially zero interfacial tension when in contact with water, brines and oils.

17. The method as defined in claim 4 further characterized in that the siliceous formation is treated with a solution of said amine having substantially zero interfacial tension when in contact with water, brines and oils.

18. The method as defined in claim 5 further characterized in that the siliceous formation is treated with a solution of said compound having substantially zero interfacial tension when in contact with water, brines and oils.

19. The method as defined in claim 9 further characterized in that the components of said mixture are so proportioned as to impart to the mixture a substantially zero interfacial tension when in contact with water, brines and oils.

20. The method as defined in claim 10 further characterized in that the components of said mixture are so proportioned as to impart to the mixture a substantially zero interfacial tension when in contact with water, brines and oils.

CHARLES M. BLAIR, Jr.